United States Patent [19]
Itoh et al.

[11] Patent Number: 5,537,543
[45] Date of Patent: *Jul. 16, 1996

[54] ELECTRONIC MAIL DRIVE TYPE COMPUTER SYSTEM AND FILE OPERATION METHOD HAVING A MAIL TERMINAL OPERATING INDEPENDENTLY OF A COMPUTER SYSTEM CONNECTED THERETO

[75] Inventors: Tutomo Itoh, Kanagawa-ken; Toshio Hirosawa, Machida; Motohide Kokunishi, Kokubunji; Atsushi Ueoka, Hachioji; Fujio Fujita, Yokohama; Yoshikazu Ichikawa, Fujisawa; Tadashi Yamagishi, Yokohama; Masahiko Ishimaru, Fujisawa; Hideki Namba, Hadano; Kazuyuki Nakamura, Tokyo; Michio Hirano, Chigasaki; Kaoru Kozuma, Yokosuka; Shigeru Sasaki, Kamakura, all of Japan

[73] Assignees: Hitachi, Ltd., Tokyo; Hitachi Software Engineering Co., Ltd., Yokohama; Hitachi Electronics Services Co., Ltd., Tokyo, all of Japan

[*] Notice: The term of this patent shall not extend beyond the expiration date of Pat. No. 5,481,698.

[21] Appl. No.: 149,553

[22] Filed: Nov. 9, 1993

Related U.S. Application Data

[63] Continuation-in-part of Ser. No. 31,729, Mar. 15, 1993.

[30] Foreign Application Priority Data

Mar. 19, 1992 [JP] Japan .................................... 4-063060
Nov. 11, 1992 [JP] Japan .................................... 4-300775

[51] Int. Cl.⁶ ...................................................... G06F 15/16
[52] U.S. Cl. ..................................... 395/185.01; 395/800
[58] Field of Search ................................... 395/575, 600, 395/625, 50, 800, 185.01

[56] References Cited

U.S. PATENT DOCUMENTS 4,520,233  5/1985  Smith ........................................ 379/95

(List continued on next page.)

FOREIGN PATENT DOCUMENTS 64-67672   3/1989  Japan .
1-108830   4/1989  Japan .
1-267758  10/1989  Japan .

OTHER PUBLICATIONS

Ser. No. 08/031,729 Mar. 15, 1993 T. Itoh et al.

(List continued on next page.)

*Primary Examiner*—Robert W. Beausoliel, Jr.
*Assistant Examiner*—Alan M. Fisch
*Attorney, Agent, or Firm*—Fay, Sharpe, Beall, Fagan, Minnich & McKee

[57] ABSTRACT

In an arrangement of a mail terminal 1, an electronic mail system 2, a job control terminal 4, and a computer system 3, a user makes a proposal of a file operation via a mail by way of the mail terminal 1. The electronic mail system 2 stores therein the proposal mail, exchanges this proposal mail with the job control terminal 4, and furthermore distributes a file operation result to the respective mail terminals. The job control terminal 4 receives a mail from the electronic mail system 2, and interprets the proposal mail, thereby executing a conversion from a mail ID into a host ID, a judgement of an access authorization with respect to the designated file, and a production of an instruction to the computer process system 3. Furthermore, an execution host computer is selected by monitoring operation conditions of the host computers. When the file operation result is sent from the computer process system 3, a mail containing this file operation result is produced, and the resultant mail is sent to the electronic mail system 2. The computer system 3 interprets a command issued from the job control terminal 4, thereby executing a reading operation from the designated file, a writing operation to the designated file, and a reading operation of a file name list.

21 Claims, 10 Drawing Sheets

U.S. PATENT DOCUMENTS

| | | | |
|---|---|---|---|
| 4,713,780 | 12/1987 | Schultz et al. | 364/514 |
| 4,767,771 | 9/1988 | Lippmann et al. | 395/200 |
| 4,962,449 | 10/1990 | Schlesinger | 395/95 |
| 4,992,940 | 2/1991 | Dworkin | 364/401 |
| 5,220,501 | 6/1993 | Lawlor et al. | 364/408 |
| 5,247,575 | 9/1993 | Sprague et al. | 380/9 |
| 5,256,056 | 11/1993 | Turtle | 395/600 |
| 5,379,421 | 1/1995 | Palazzi, III et al. | 395/600 |

OTHER PUBLICATIONS

Learning Lexis: A Handbook for Modern Legal Research, Mead Data Central (1991).

Notes on Printing and Sotring to Disk, Mead Data Central, 1991.

Westlaw Database List, West Publishing, 1994.

FIG. 2

```
                PROPOSAL BIBLIOGRAPHY          ⟋7
┌─────────────────────────────────────────────┐
│(1) NAME OF HOST COMPUTER                    │~51
├─────────────────────────────────────────────┤
│(2) RECEIVING INSTRUCTION FOR                │~52
│    FILE NAME LIST                           │
├─────────────────────────────────────────────┤
│(3) FILE READING REQUEST                     │~53
│   ┌─────────────────────────────────────┐   │
│   │(a) NAME OF FILE                     │~54│
│   └─────────────────────────────────────┘   │
├─────────────────────────────────────────────┤
│(4) FILE WRITING REQUEST                     │~55
│   ┌─────────────────────────────────────┐   │
│   │(a) NAME OF FILE                     │~56│
│   ├─────────────────────────────────────┤   │
│   │(b) CONTENT OF WRITE                 │~57│
│   └─────────────────────────────────────┘   │
├─────────────────────────────────────────────┤
│(5) FILE EDITING REQUEST                     │~58
│   ┌─────────────────────────────────────┐   │
│   │(a) NAME OF FILE                     │~59│
│   ├─────────────────────────────────────┤   │
│   │(b) CHARACTER CHAIN TO BE            │~60│
│   │    SUBSTITUTED=CHARACTER CHAIN      │   │
│   └─────────────────────────────────────┘   │
└─────────────────────────────────────────────┘
```

FIG. 3

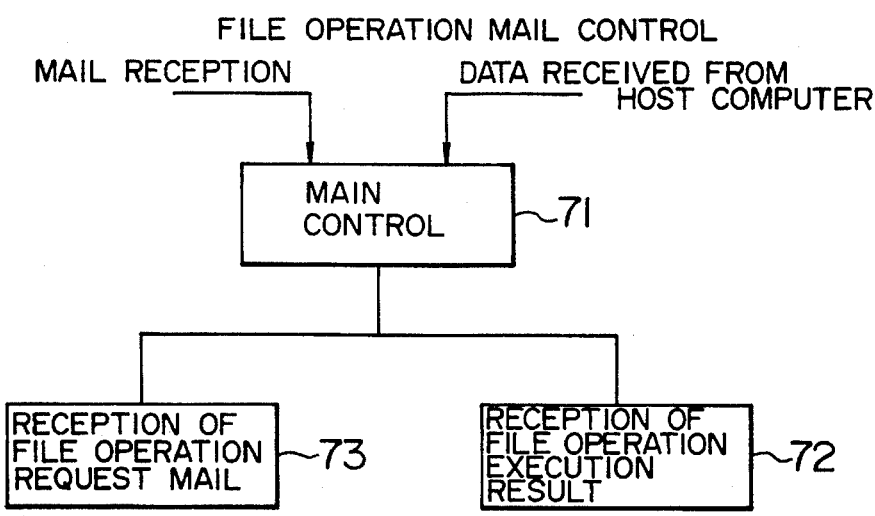

FIG. 5A FILE OPERATION REQUEST

| IDENTIFIER ID 1 | HOST NUMBER | HOST USER ID | CONTENT OF PROPOSAL BIBLIOGRAPHY |
|---|---|---|---|
| 101 | 102 | 103 | 104 |

FIG. 5B FILE OPERATION RESULT

| IDENTIFIER ID 2 | DISTRIBUTION ID | RESULT CODE | FILE OPERATION RESULT |
|---|---|---|---|
| 105 | 106 | 107 | 108 |

FIG. 5C ACCESS AUTHORIZATION EXAMINATION DEMAND

| IDENTIFIER ID 3 | HOST NUMBER | HOST USER ID | FILE NAME 1 | ... | FILE NAME n |
|---|---|---|---|---|---|
| 109 | 110 | 111 | 112 | | 112 |

FIG. 5D ACCESS AUTHORIZATION EXAMINATION RESULT

| IDENTIFIER ID 4 | HOST USER ID | FILE NAME | EXAMINATION RESULT | ... |
|---|---|---|---|---|
| 113 | 114 | 115 | 116 | |

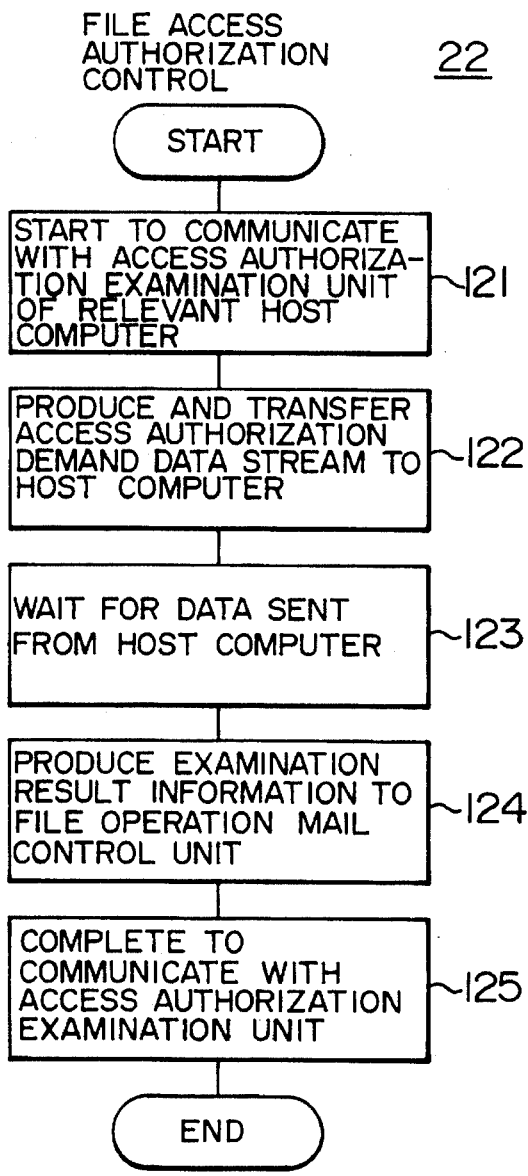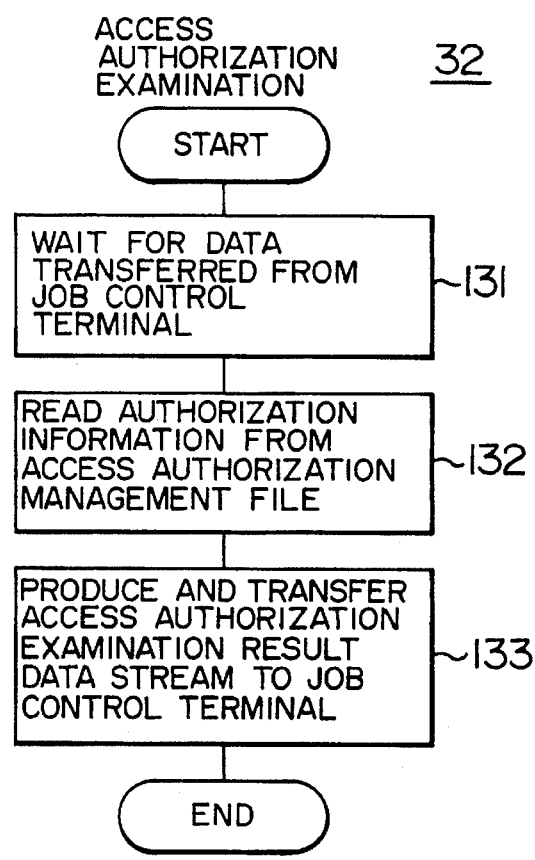

```
 171          172    173        174
  )            )      )          )
LIST       FILE NAME∧MAIL (DISTRIBUTION
  175                           DESTINATION ID)
   )
LISTC      MAIL (DISTRIBUTION DESTINATION ID)
  176
   )
LISTD      FILE NAME∧MAIL (DISTRIBUTION
                                DESTINATION ID)
```

ELECTRONIC MAIL DRIVE TYPE COMPUTER SYSTEM AND FILE OPERATION METHOD HAVING A MAIL TERMINAL OPERATING INDEPENDENTLY OF A COMPUTER SYSTEM CONNECTED THERETO

CROSS REFERENCE TO RELATED APPLICATION

This is a continuation-in-part application of the patent application No. 08/031,729, filed Mar. 15, 1993, entitled "COMPUTER SYSTEM AND JOB EXECUTING METHOD".

BACKGROUND OF THE INVENTION

The present invention relates to a computer system for executing a file operation by utilizing an electronic mail system, and also to a file operation method thereof.

Various computer systems using electronic mail have been proposed. For instance (1) SYSOUT data, i.e., a job execution result is asked by an electronic mail on a host computer and registered in a mail box of a distribution destination, as disclosed in JP-A-1-108830; (2) a job execution is requested for a host manager by an electronic mail so that an execution result mail is distributed by a host computer, as disclosed in JP-A-64-67672; and (3) an execution of a job and a distribution of the execution result are requested for a host computer by an electronic mail through an electronic mail system independent of the host computer, as described in JP-A-1-267758.

SUMMARY OF THE INVENTION

In the above-described prior art, when the job execution is requested via the electronic mail, either the job control file used to instruct the execution method of the requested job, or the data file used during the job execution must be previously registered in the computer system. However, in actual, these files must be read and/or written prior to requesting such a job execution. Nevertheless, since these conventional computer systems using the electronic mail system do not disclose such a method for reading and conversely writing the file not managed by this electronic mail system, the content of this file cannot be changed, or updated.

An object of the present invention is to provide a file operating method for realizing such a file operation as reading and writing operations with respect to a file of a computer system independently provided with an electronic mail system.

To achieve the above-described object, in accordance with a first desirable aspect of the present invention, an overall system is arranged by a mail terminal, an electronic mail system, a computer system for operating a job execution and a file, and a job control terminal functioning as an apparatus for monitoring an operation of this computer system. At the mail terminal, a user requests a file operation by mail. The electronic mail for requesting the file operation can instruct: (a) a host computer name to be operated; (b) operation method such as reading and writing operations, and a file name; and further (c) a reception request for a file name list of requesting users, stored in the host computer. It should be noted that a request mail will also be referred to as "a proposal mail" in the following description. The electronic mail system corresponding to a host computer for a group of mail terminals, comprises a storage apparatus for file operation mails, and sends this file operation requesting mail to the job control terminals, and also comprises a mail exchange means with the job control terminal, for conversely, receiving a file operation result mail from the job control terminal.

The job control terminal comprises: a storage apparatus of a file operation mail requested by the electronic mail system; means for judging whether or not the above-described proposal mail is acceptable, for judging whether or not an access right is allowed to read/write a file name designated by the mail, and for issuing a control command to an instructed computer system by interpreting the content of the proposal mail; means for receiving file operation result data from the computer system thereby to produce a mail for reporting the data reception to the proposer; and, means for exchanging the above-described mail with the electronic mail system. Since the job control terminal is so constructed that it is operable independently from the computer system, (a) the request for file operation may be always accepted independent to the operating time of the computer (namely, functions as an accepting server). (b) Since overall operations of the computer system are externally managed, other computers under operation may be selected if one computer malfunctions, or operation thereof is reduced. (c) Since it is externally judged for allowing to accept the request mail, and for the access right whether or not the file name designated by the request must can be read/written, the judgement result of accepting of the request mail can be quickly announced independent to load conditions of the host computer, and furthermore secrecy of resource for the computer system can be protected.

Then, the computer system interprets a command issued from the job control terminal to execute the instructed file operation. In case of issuing of the read instruction, the content of the file is distributed via the job control terminal to the electronic mail system.

In a second desirable aspect of the present invention, an entire system is arranged by a mail terminal, an electronic mail system, and a computer system. Both of the electronic mail system and the computer system comprise mail exchanging means, thereby realizing a series of process operations as described in the first desirable aspect. In this second aspect, since no job control terminal is employed, the electronic mail system directly communicates with the computer system, thereby judging the operation conditions of the computer system. The host computer is so constructed as to allow the acceptance of the proposal mail, and judge such an access right whether or not the file name instructed by the proposal mail can be read/written.

In accordance with a third desirable aspect of the present invention, the TSS (time sharing system) terminal connected to the computer system employed in either the first aspect, or the second aspect, instructs a mail destination when a file operation command (file reading and file list display) is supplied. When the file operation is completed, the mail of file operation results is distributed to the electronic mail system by way of the mail exchange as described in the first aspect and the second aspect. The third aspect corresponds to such a method for immediately instructing the file operation to accept the operation result, which is different from the above-explained first and second aspects where the file operation is requested by the mail.

BRIEF DESCRIPTION OF THE DRAWINGS

FIG. 2 schematically represents a designation item of a proposal format for a file operation request;

FIG. 3 schematically indicates a process structure of a file operation mail control unit employed in the job control terminal;

FIGS. 5A to 5D schematically show formats of transfer data streams between the job control terminal and the host computer;

FIG. 6 is a process flow chart for explaining control operations of the file access right control unit employed in the job control terminal;

FIG. 7 is a process flow chart for explaining inspecting operations of the access right inspecting unit employed in the host computer;

DESCRIPTION OF THE PREFERRED EMBODIMENTS

Referring now to FIGS. 1A to 12, embodiments of the present invention will be described.
(Embodiment 1)

Figure 1A:
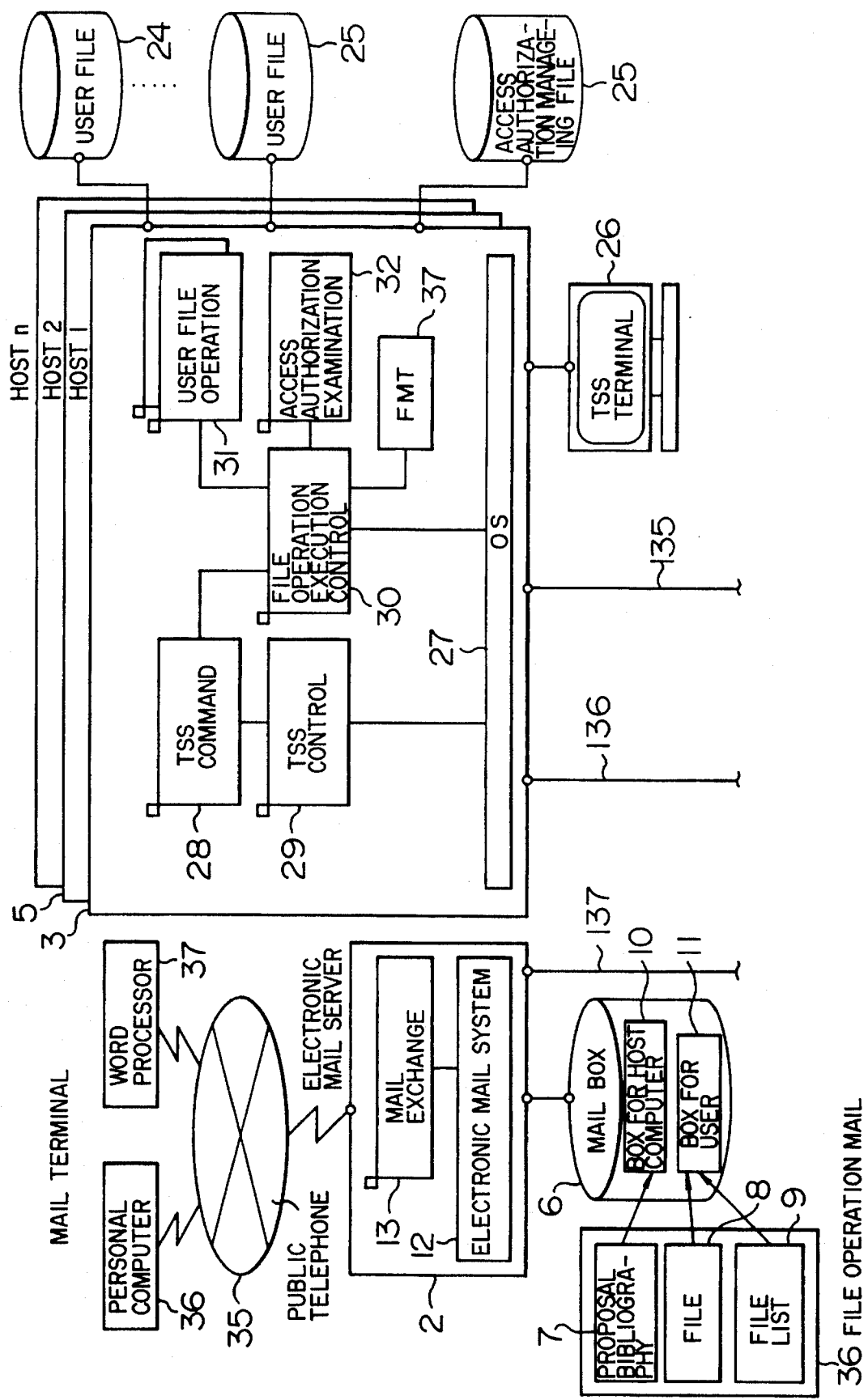
FIGS. 1A and 1B are constructive diagrams for showing a file operating method of an electronic mail drive type computer system according to the present invention.
Figure 1B:
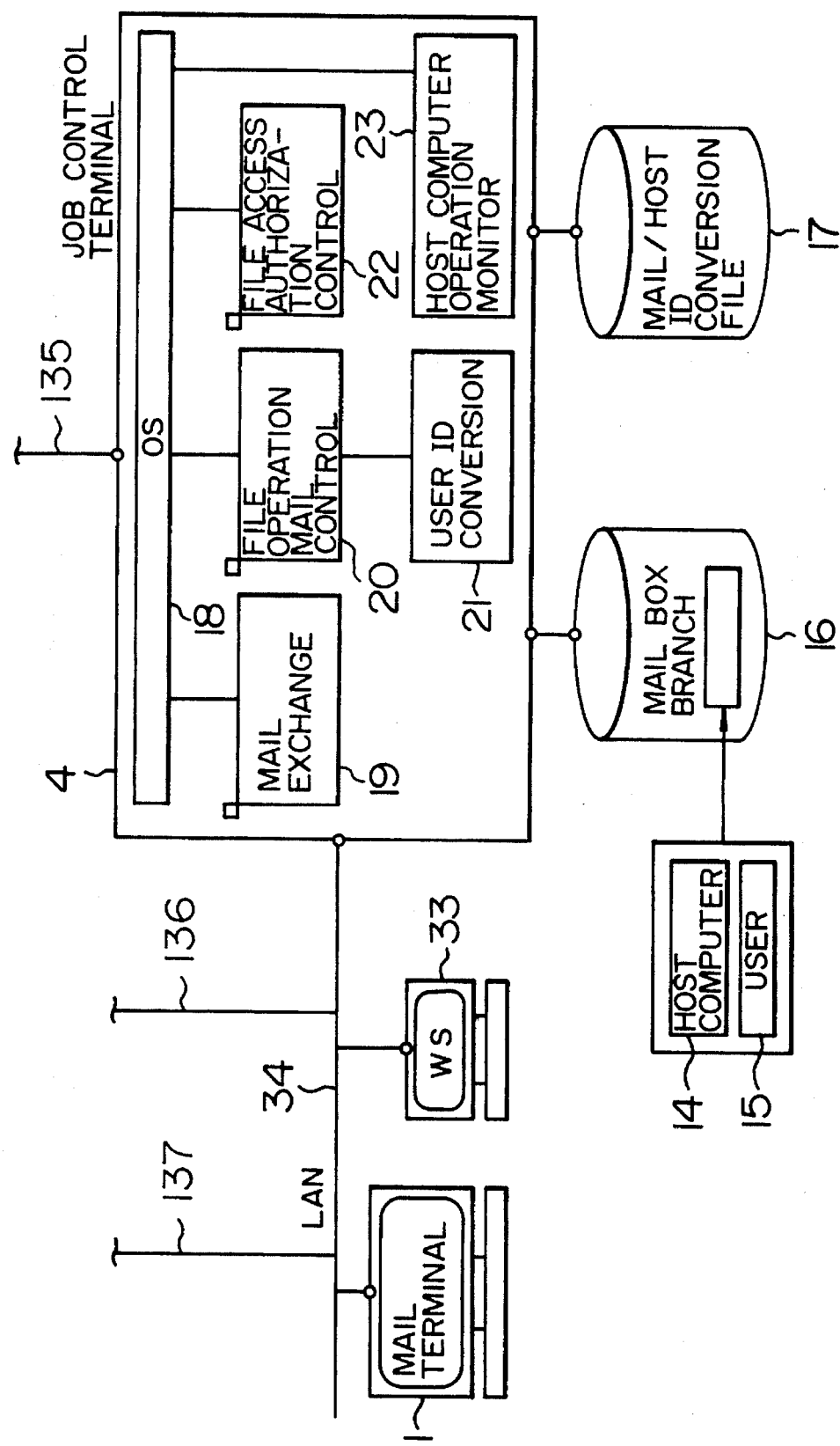

FIGS. 1A and 1B are constructive diagrams for showing a file operating method of a computer system by an electronic mail drive according to the present invention.

A computer system 3 is connected via a LAN 34, and constructed of a mail terminal 1 for transmitting/receiving a mail, an electronic mail server 2 for performing a process instructed by the mail terminal 1, a group of host computers 5, and a job control terminal 4 for monitoring the execution of the jobs executed by the host computers 42. Furthermore, the computer system 3 is connected with the job control terminal 4.

Such an electronic mail system is disclosed in the copending Application No. 08/031,729, the contents of which is incorporated in this application by reference.

The LAN 34 may be connected with other workstations WS 33 having no direct relation to the present invention. A feature of this embodiment is such that the electronic mail server 2 is constructed on another computer different from the computer system and can be communicated with the job control terminal 4 by way of mails. The features achieved by the above-described construction are such that the job control terminal 4 basically monitors the operations of the computer system 3, especially monitors the operation conditions thereof, and further executes the file access right judgement control with the host computer 5 instructed for the request mail related to the file operation control issued from the mail terminal 1 based upon this monitoring result, and may produce an instruction of file operation to this host computer when the file access is permitted. When no host computer is instructed, the job control terminal 4 selects one of the host computers under operation which should be monitored, and executes the abovedescribed control. It is a requesting method under such an arrangement that a file storage apparatus 24 is commonly used with the group of host computer 5. Furthermore, the job control terminal 4 can continuously accept the request mails related to the file operations without being influenced by the operating conditions of the computer system 5. To the electronic mail server 2, various terminals such as a personal computer 36 and a wordprocessor 37 as mail terminals are connectable via a public network 35 by a telephone line. A mail box 6 is a post-office box for managing a mail transmitted/received from/by the mail terminal 1. To a post-office box 10 for the host computer, a proposal bibliography mail 7 for requesting a file operation is stored, whereas a post-office box 11 for user is provided in relation to the respective users, into which a file content mail 8 and a file list mail 9, which have been read from the host computer 5, are stored. These mails 7 to 9 are such mails related to the file operation controls according to the present invention, and will be wholly referred to as a "file operation mail" 36. It should be noted that the mail box 6 corresponds to a mail box for a general-purpose electronic mail system, and a user utility mail other than the file operation mail is present.

The electronic mail server 2 is constructed of the previously provided electronic mail system 12 and a mail conversion 13 for converting the file operation mail 36 with the job control terminal 4. The mail conversion 13 sends the proposal bibliography mail 7 within the post-office box 10 for the host computer to the job control terminal 4. Conversely, the mail conversion 13 causes a file operation result mail sent from the job control terminal 4 to be stored into the post-office box 11 for user. During the mail conversion, the mail formats corresponding to the respective systems are converted. A block 13 within the electronic mail server 2 is arranged by a program.

To the job control terminal 4, a mail box branch 16 and a mail/host ID conversion file 17 are connected. The mail box branch 16 has, like the mail box 6 of the electronic mail server 2, a host-addressed post-office box 14, and a user-addressed post-office box 15, electronic mail. The mail box branch 16 holds only the file operation mail 36.

The aforementioned construction, in which the electronic mail server 2 and the job control terminal 4 individually have the mail boxes, has the following advantages:

(a) The job control terminal 4 need not be conscious of the mail format intrinsic to the electric mail server 2, but may have a standard mail format (e.g., the mail format o the UNIX system).

(b) By employing the mail box branch 16, the job control terminal 4 may store a mail concerning a file execution, but need not be conscious of other general user mails.

(c) Moreover, in case that all of the host computers are wholly inactive, the mail is pooled in the mail box branch 16 until the host computer starts its operation.

It should be noted that the mail format includes mainly mail header information (i.e., control information other than text, related to, for example, a name of an issuer of a mail, a name of a receiver of execution results, address information) which is varied depending upon sorts of electronic mail systems.

The mail/host ID conversion file 17 stores a table providing correspondence between the mail ID when the user logs in a mail on the electronic mail server 2 issued from the mail terminal 1, and the host ID of a host computer for execution. The mail ID is used for testing a user allowance of a request mail related to a file operation, and the host ID is used for testing user authorization of a user file of the host computer.

The components of the job control terminal 4 will now be described as follows: An operating system (OS) 18 controls the entire job control terminal 4. The job control terminal 4 is arranged by a computer, and the respective constructive components are arranged by programs. A file operation mail control 20 interprets a file operation mail 36 requested from the mail terminal 1 to issue a control command to the computer system 3. Furthermore, this file operation mail control 20 receives the file operation result from the computer system 3 to produce a file operation mail 36 and then stores the file operation mail 36 into the post-office box 15 designated for user of the mail box branch 16. A mail exchange 19 performs a mail exchange 13 within the mail server 2 and an exchange process of the file operation mail. The mail which has been read from the electronic mail server 2 by the mail exchange process, is stored into the post-office box 14 designated for host computer of the mail box branch 16. Conversely, the mail stored in the post-office box 15 for the user of the mail box branch 16 is mail-exchanged, and then is stored into the respective post-office boxes 11 of the mail box 6. During the mail exchange operation, the mail format is converted.

A host computer operation monitoring control 23 monitors operation conditions of the host computers while communicating with the OS of each host computer. The host computer operation monitoring control 23 manages whether the host computer is under operation or stopped, executes a file access authorization judgement control with the designated host computer 5 under operation when the file operation by the mail is accepted, and issues an instruction of the file operation to the relevant host computer if it is allowed. In case that no instruction is issued to the host computer, the job control terminal 4 selects one of the host computers' group under operation that are being monitored, in accordance with the registration order within the job control terminal 4, and the host computer operation monitoring control 23 performs the above-described control. When the relevant host computer is stopped, the request mail is held in the mail box branch 16 until this host computer is brought into the operation state. A user ID conversion 21 converts a user ID of a mail issuer into a corresponding user ID of the host computer. When the relevant mail ID is not registered for a certain user, it is judged that this user is not allowed to use the computer system 3 and the resultant mail is returned to this user. A file access authorization control 22 judges whether or not the user file of the computer system 3 designated by the file operation request mail 36 is accessible based upon the above-explained converted host ID. If it is accessible, then the file access authorization control produces an instruction to the host computer. Conversely, if it is not accessible, the resultant mail is returned to the user.

The computer system 3 is arranged by a plurality of host computers 5. A plurality of TSS terminals 26, a user file 24 to be operated as a disk file, which is requested by the mail terminal 1, and an access authorization file 25 for managing access authorizations such as read/write by the user to the user file, are connected to this computer system 3. In the computer system 3 according to this embodiment, the disk files 24 to 25 are connected to the respective host computers and are commonly used. A program structure of the computer system 3 is arranged by an OS (operating system) 27 for controlling the overall computer system, a file operation execution control 30 for controlling a file operation requested by the mail terminal 1, a TSS control 29, a TSS command 28 executed under control of the TSS control 29, a user file operation 31 for executing a file operation to the user file 24, an access authorization examination 32 for examining an access authorization with reference to the access authorization file 25, and a file operation mail table (FMT) 37 for storing a file operation request mail. A detail explanation of the present invention will be made with reference to the drawings subsequent to FIG. 2. It should be noted that a method for sending a file operation result by a mail in response to the TSS command 28 will be described with regard to an embodiment 3.

Referring now to FIG. 2 to FIG. 10, detailed descriptions of processes will be made with reference to reference numerals/symbols shown in FIGS. 1A and 1B.

FIG. 2 schematically shows a detail of the proposal bibliography 7 of the post-office box 10 for host computer. Reference numeral 51 indicates a name (title) of host computer for managing a file to be operated. When the name of host computer is omitted, one of the host computers under operation is selected from the host computer group which is monitored by the job control terminal 4. It is such a designation method in an arrangement that the user files are commonly used by the host computer group. Reference numeral 52 indicates a receiving instruction for a file name list of the host computers managed by the user. Reference numeral 53 represents a request for receiving as a mail a content of a file in the host computer, and reference numeral 54 shows a name of file to be read. Reference numeral 55 is a request for writing a content of a mail into a file of the host computer. Reference numeral 56 shows a name of file to be written. Reference numeral 57 is a content of a mail written into the relevant file. When no file name is located in the host computer, a file is newly allocated. Reference numeral 58 is an editing request for a file of the host computer. Reference numeral 60 shows a character chain or stream substituted by another character chain of this file for a substitution purpose. It should be understood that all of the character chains of this file are to be edited. The above-explained file operation request functions 52, 53, 55 and 58 may be separately designated.

The contents of the respective processes will now be explained in detail with reference to FIG. 3 to FIG. 10. FIG. 3 schematically shows a program structure of the file operation mail control 20 employed in the job control terminal 4. The file operation mail control 20 is initiated when the file operation mail of the mail exchange 19 is received, and when the file operation result is received from the host computer. In addition, this file operation mail control 20 is periodically initiated in order to process the file operation request mail stored in the mail box branch 16. Reference numeral 71 indicates a main control. The main control 71 executes processes to initiate a reception 72 of file operation execution result when the file operation result is received from the host computer, and also to initiate a reception 73 of file operation request mail when the file operation mail is received. The reception 72 of file operation result analyzes the data stream transferred from the host computer 5 thereby to form a file operation result mail, and writes this file operation result mail into the post-office box 15 for user employed within the mail box 16. The transfer data stream will be explained with reference to FIGS. 5A to 5D.

Figure 4:
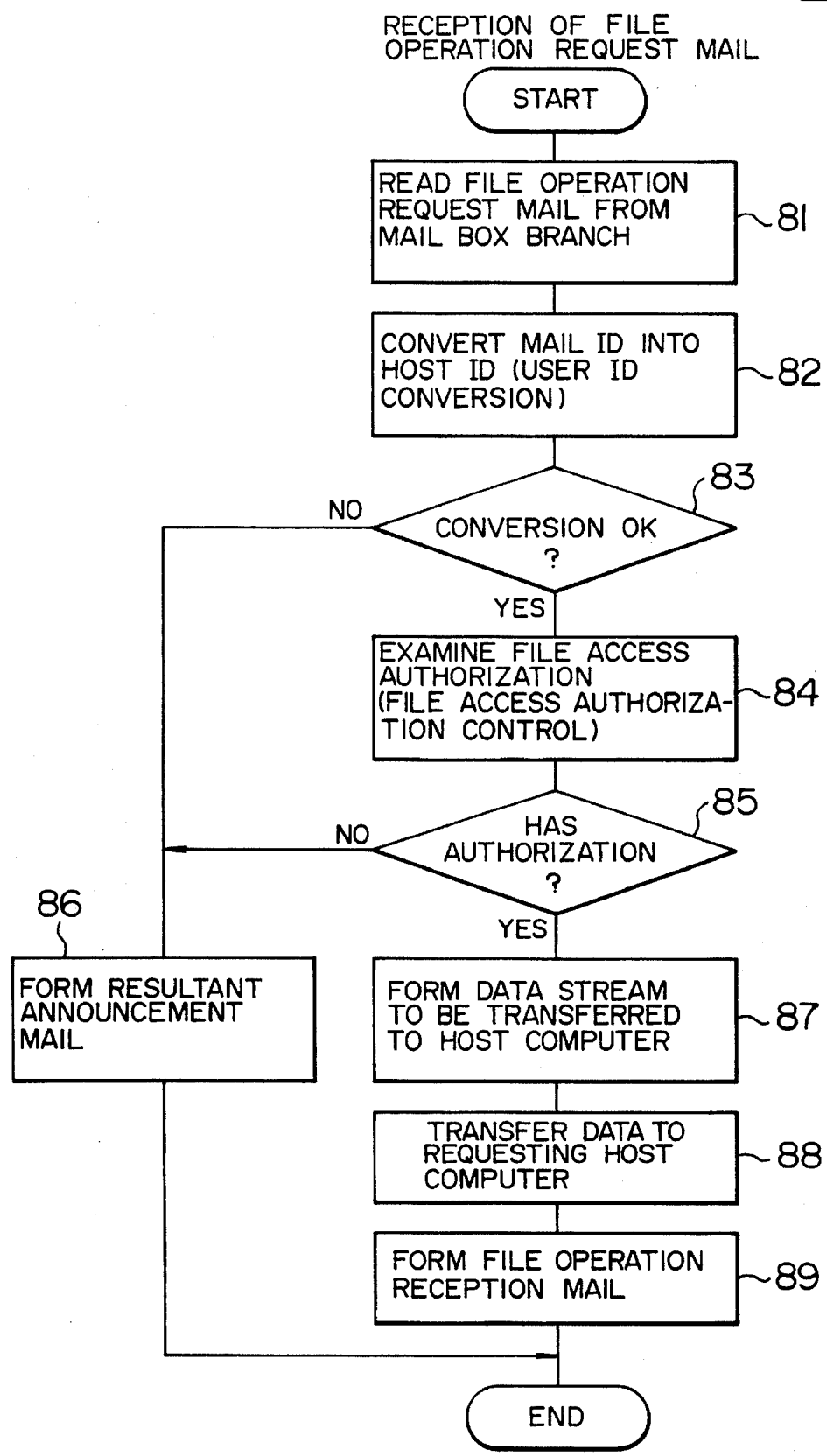
FIG. 4 is a process flow chart for explaining an acceptance of a file operation requesting mail performed in the file operation mail control unit.

Next, the process operation of the reception 73 for file operation request mail will now be explained with reference to a flow chart shown in FIG. 4. At a step 81 of this flow chart, the file operation request mail is read out from the post-office box 14 designated to the host computer of the mail box branch 16. At a step 82, the mail ID of this mail request user is converted into the corresponding host ID of the computer system 3. This ID conversion is performed by calling the user ID conversion 21. The user ID conversion 21 converts the user ID of the mail requester into the use ID of the host computer by using the mail/host ID converting file 17. If the corresponding mail ID is not registered in the conversion file 17, a judgement is made that this mail requester is such a user who is not allowed to use the computer system 3. At a step 83, another judgement is made as to whether or not the mail ID conversion has been correctly performed. If the mail ID conversion has not be correctly performed, namely if it is judged that the mail requester is such a user who is not allowed to utilize the computer system 3 with regard to the file operation, the process operation defined at a step 86 is executed. At the step 86, the resultant announcement mail representative of the not permitted user is produced and then is written in the post-office box 15 for user in the mail box branch 16. At a step 84, the file access authorization control 22 is initiated to judge whether or not the user file of the computer system 3 designated by the file operation request mail is accessible based on the above-described converted host ID. If there is no access authorization at a step 85, then a process operation defined at a step 86 is executed at which the resultant announcement mail is produced and then written into the post-office box 15 for user in the mail box branch 16. A process operation defined by a step 87 is executed when such a judgement is made that the computer system 3 is allowed to be used by the user and the access authorization is given in the designated file. At this step 87, a data stream to be transferred to the host computer is produced. At a step 88, a process operation for transferring data to the host computer 5 designated by the file operation request mail is carried out. When no host computer is designated, the job control terminal 4 selects one of the host computers under operation, which are monitored, whereby the data transfer process is performed. It should be noted that when the relevant host computer is in an inactive state, the file operation request mail is again stored into the mail box branch 16, and then it is awaited for the host computer is brought into the operation state. At a step 89, when the content of the request mail has been correctly transferred to the host computer, a reception mail for file operation request is written into the post-office box 15 for user of the mail box branch 16. A series of the above-described process operation corresponds to the process operation for the reception 73 of file operation request.

With reference to FIGS. 5A to 5D, a format of a data stream will now be described which is transferred between the host computer 5 and the job control terminal 4. FIG. 5A shows a format of a data stream about a file operation request, and this data stream is transferred from the job control terminal 4 to the host computer 5. In FIG. 5A, reference numeral 101 indicates an identifier ID1 of this data stream, reference numeral 102 shows a host number selected for the host computer to be executed. Furthermore, reference numeral 103 is a host user ID obtained by the user ID conversion 21, and reference numeral 104 shows a content of a file operation proposal bibliography. FIG. 5B represents a format of a data stream about a file operation result. This data stream is transferred from the host computer 5 to the job control terminal 4. In FIG. 5B, reference numeral 105 shows an identifier ID2 of this data stream, reference numeral 106 indicates distribution information of the file operation result mail, reference numeral 107 is an end code of the file operation result, and reference numeral 108 shows a file operation result. The file operation result includes either the content of the file read from the host computer, or the file name list. The above-described data stream is transferred to the job control terminal 4 in unit of the request items for the proposal bibliography shown in FIG. 2. The content of this transferred data stream is transferred as the file operation result mail to the user who has requested the file operation. FIG. 5C represents a data stream about an access authorization examination demand, and the file name designated in the proposal bibliography shown in FIG. 2 is to confirm whether or not a user for requesting file operation owns an access authorization with respect to the host computer 5. In FIG. 5C, reference numeral 109 shows an identifier ID3 of the data stream, reference numeral 110 indicates a host number selected as a host computer to be executed, reference numeral 111 denotes a host user ID, and reference numeral 112 represents a list of file names. FIG. 5D indicates a data stream about an access authorization examination result, which corresponds to an answer of the host computer 5 with respect to the examination demand of FIG. 5C. In FIG. 5D, reference numeral 113 shows an identifier ID4 of the data stream, reference numeral 114 indicates a file name designated in FIG. 5C, and reference numeral 115 is an examination result. This examination result is information as to whether or not it is accessible. Reference numerals 115 and 116 are information corresponding to the file name demanded in FIG. 5C.

Subsequently, a process operation of the file access authorization control 22 will now be explained with reference to FIG. 6. The file access authorization control 22 is initiated when the examination for the access authorization of the file name is required which is designated in the proposal bibliography by the file operation mail control 20. In the flow chart of FIG. 6, both of an access authorization examination 32 of the relevant host computer 5 and a program communication procedure are commenced at a step 121. At the next step 122, the data stream of the access authorization examination demand of FIG. 5C is produced and then is transferred to the host computer 5. At a step 123, a reception of examination result data derived from the host computer 5 is awaited. At a step 124, information for returning the access authorization examination result to the file operation mail control 20 is produced from the data transferred from the host computer 5. At a step 125, a communication with the access authorization examination 32 is terminated.

Referring now to FIG. 7, a process operation of the access authorization examination 32 of the host computer 5 will be described. The access authorization examination 32 is communicates with the file access authorization control 22 of the job control terminal 4. In a flow chart of FIG. 7, a step 131 is performed to wait for access examination demand data issued from the job control terminal 4. At a step 132, the respective access authorization information about the respective users with respect to the respective file names designated by the data stream of the access authorization examination demand derived from the job control terminal 4, is read from the access authorization file 25. At a step 133, the access authorization information about the respective file names of the relevant user is examined based on the information read at the previous step 132. Also, the data stream of the access authorization examination result shown in FIG. 5D is produced and then is transferred to the job control terminal 4. A series of the above-explained process operations correspond to the process operation of the access authorization examination 32.

Figure 8:
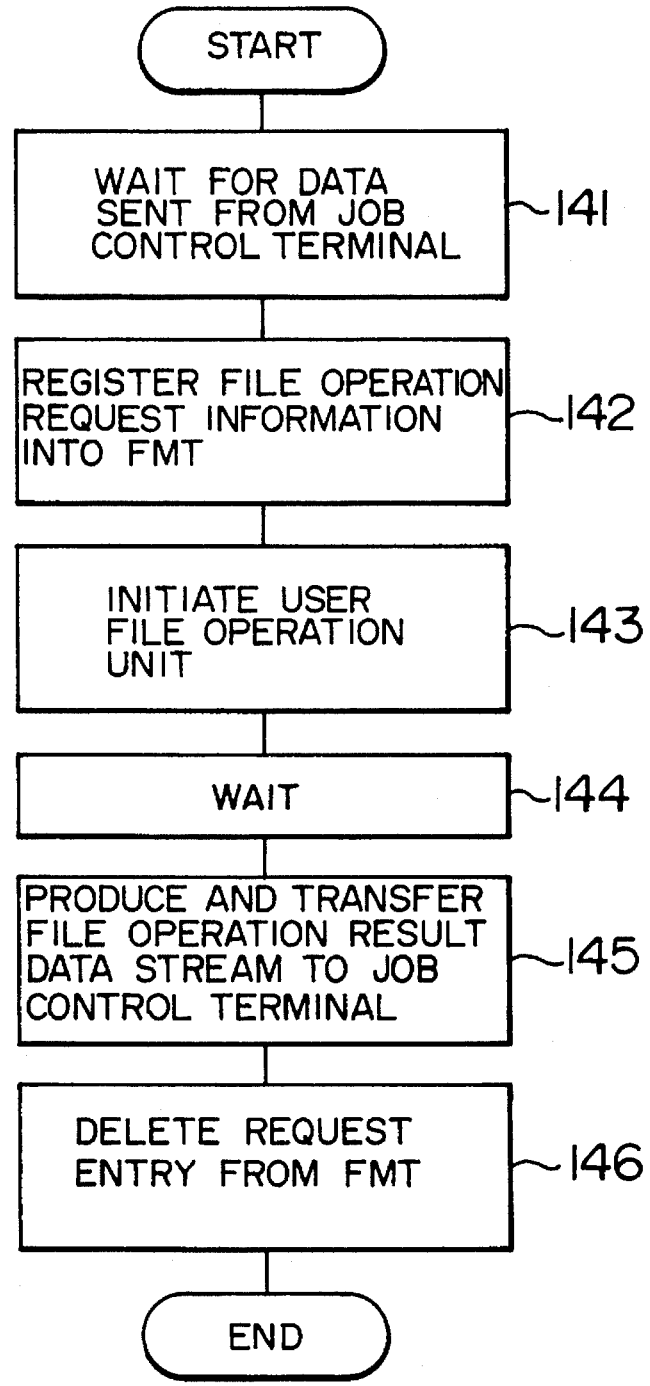
FIG. 8 is a process flow chart for explaining control operations of the file operation execution controlling unit employed in the host computer.

Subsequently, a description will now be made of a process operation for the file operation execution control 30 of the host computer 5 with reference to FIG. 8. It should be noted that the file operation execution control 30 corresponds to a major constitutive element according to the present invention, which controls the examination of the file operation requested from the mail terminal. In a flow chart of FIG. 8, a step 141 is to wait for receiving data derived from the job control terminal 4. At a step 142, the data stream (shown in FIG. 5A) of file operation request transferred from the job control terminal 4 is analyzed and then the content of the demand is registered into an FMT (file operation mail table) 37. The FMT 37 will be explained in detailed with reference to FIG. 10. At a step 143, in order to actually execute the file execution, the user file operation 31 is initiated. A step 144 is to wait completion of the process operation for the user file operation 31. At a step 145, the process program of this step is initiated after the file operation is accomplished. At this step 145, the data stream (shown in FIG. 5B) of file operation result is produced and then is transferred to the job control terminal 4. At a step 146, the relevant entry after the completion of this process operation is deleted from the FMT 37. A series of the above-explained descriptions relate to the process operation of the file operation execution control 30.

Figure 9:
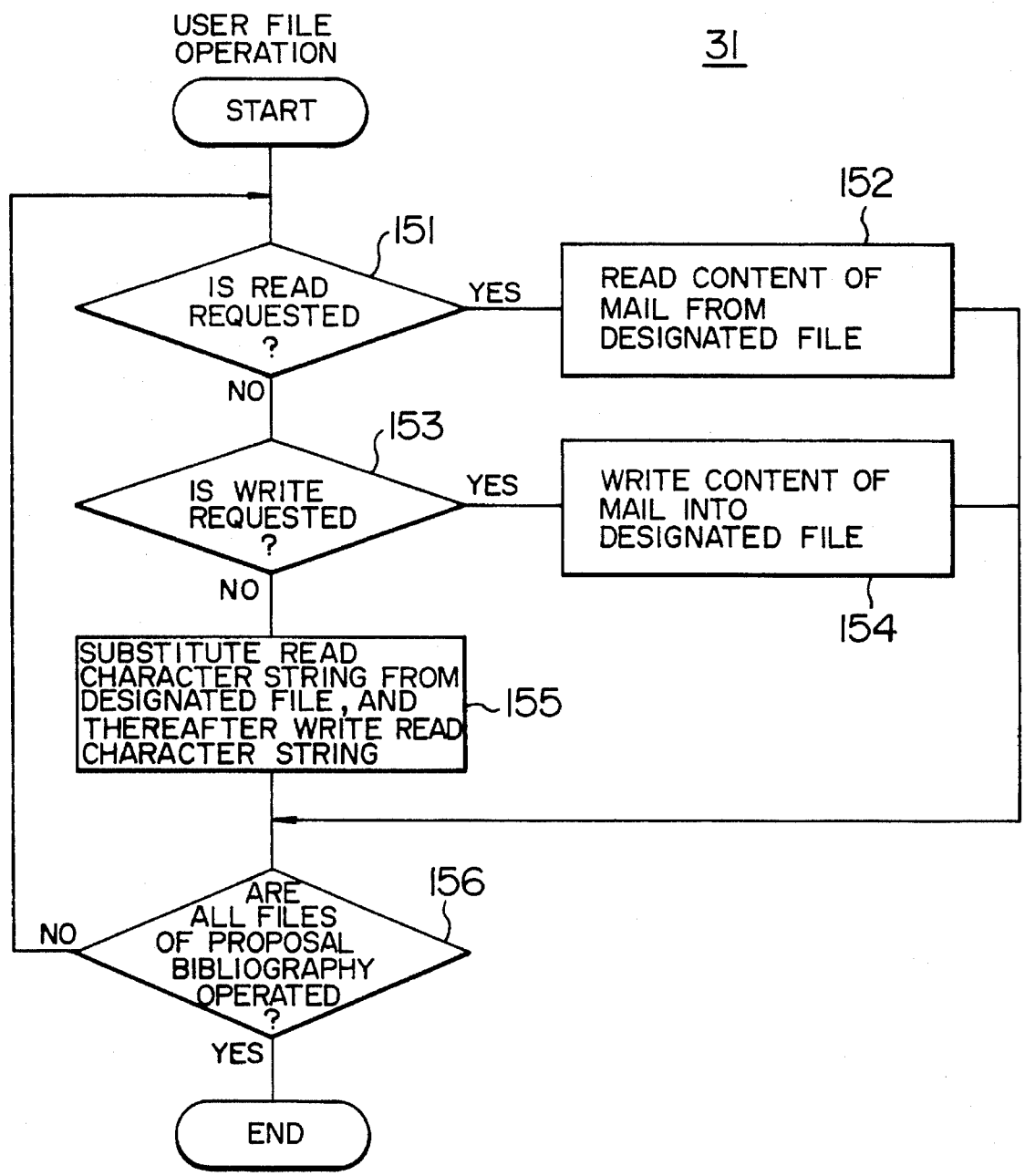
FIG. 9 is a process flow chart for explaining operations of the user file operating unit employed in the host computer.

A process operation of the user file operation 31 will now be explained by way of a flow chart shown in FIG. 9. In the user file operation 31, an actual file operation (write and read operations etc.) for the user file 24 requested by the proposal bibliography 7 is performed. At a step 151 of the flow chart of FIG. 9, a check is done as to whether or not the file operation request item is read. If the read instruction is made, then the content of the file designated from the user file 24 is read at a step 152. After the file operation request item has been read, the process operation branches to a step 156. At a step 153, a judgement is made whether or not the file operation request item corresponds to a write instruction. If this request item is the write instruction, then the write content 57 of the proposal bibliography 7 is written into the designated file. After this content write operation has been accomplished, the process operation branches to a step 156. A process operation defined at a step 155 corresponds to that when the file edit request is made, in which the content of the designated file is read, after the character stream instructed by the entry 60 of the proposal bibliography 7 has been substituted, the substitution result is written into the disk file in the same file name. At a step 156, a check is done as to whether or not the process operations about all of the request items for the file operations with respect to the proposal bibliography 7 have been accomplished. If the process operations about the request items have not yet been accomplished, then the process operation is returned to the step 151 at which the request item of the next file operation is performed.

Figures 10, 12:
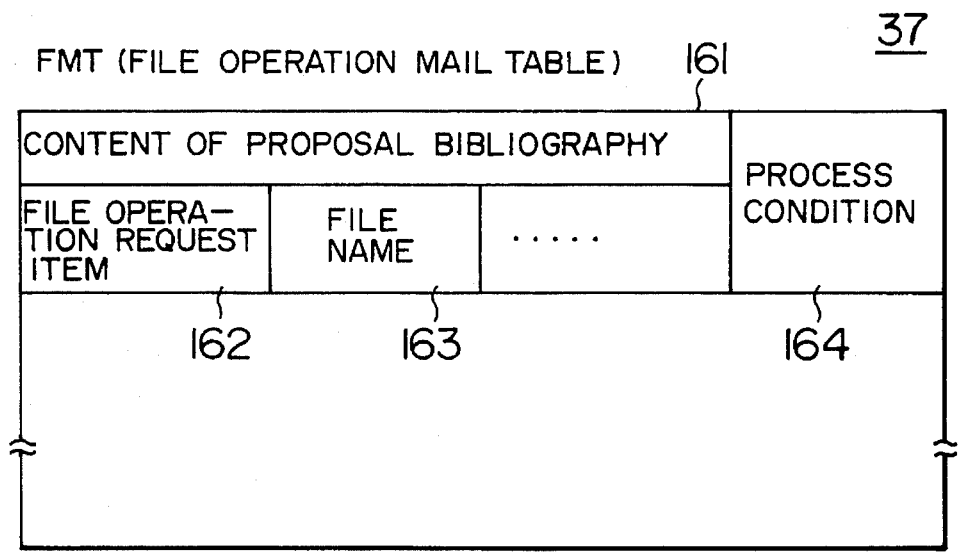
FIG. 10 is a process flow for explaining operations of the file operation mail table (FMT)
FIG. 12 is a mail distribution designating system during execution of file operation of TSS command.

Next, a content of the above-explained FMT (file operation mail table) 37 will now be described with reference to FIG. 10. In FIG. 10, reference numeral 161 denotes a content of a proposal bibliography which has been requested by the mail terminal 1, reference numeral 162 indicates a file operation request item, and reference numeral 163 represents a file name. The content of the proposal bibliography 161 contains a plurality of file operation request items designated by the proposal bibliography. Reference numeral 164 holds process conditions of the corresponding proposal bibliography, and represents process conditions of the file operation execution control 30. As the process conditions, there are "unprocessed condition", "condition under process", and "processed condition". Under the file operation execution control 30, after the data stream about the file operation result has been transferred to the job control terminal 4, the relevant entry is deleted.

A series of the above-explained operations have been made of the embodiment 1. Now, a modification of this embodiment 1 will be explained. That is, the modification is such an arrangement that there are independently the disk files 24 and 25 connected to the respective host computers. In such an arrangement, the respective host computers are geographically dispersed, and each host computer is present as a sole system. Even in this modification case, the construction of the job control terminal is not changed. It should be noted that the line 35 for connecting the respective computer with the job control terminal may be substituted by a transmission line. Even in such a system arrangement, the electronic mail server 2 and the job control terminal 4 may be similarly operated.

(Embodiment 2)

Figure 11:
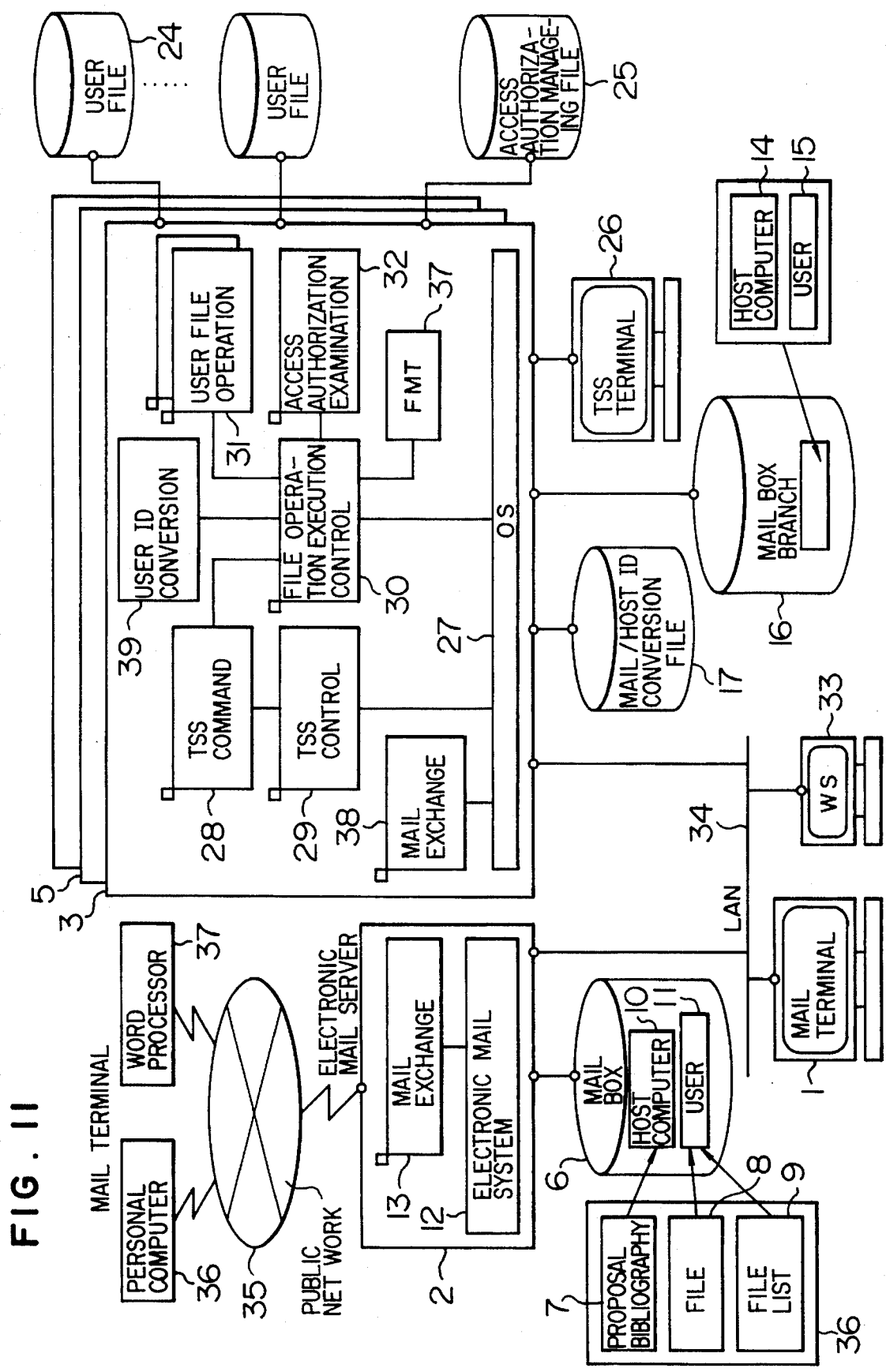
FIG. 11 is another constructive diagram for indicating another file operating method of an electronic mail drive type computer system according to the present invention.

The above-described system according to the embodiment 1 as shown in FIGS. 1A to 10 is constructed of the electronic mail server 2, the job control terminal 4, and the computer system 3. Then, referring to FIG. 11, another embodiment in which no job control terminal 4 is provided will now be described. This embodiment corresponds to a realizing method under such an operation condition that no job control terminal for wholly controlling the computer system 3 is employed. The following description of the embodiment 2 is mainly based on the differences from the embodiment 1. The mail exchange 13 of the electronic mail server 2 was performed by the mail exchange 19 of the job control terminal 4 and the exchange process of the mail in FIG. 1. To the contrary, in FIG. 11, the file operation request mail is stored in the post-office box 14 designated to host computer in the mail box branch connected to the host computer 5 by executing a similar process to the mail exchange 38 of the host computer 5. A file operation request mail is derived from the post-office box 14 designated to host computer in the mail box branch 16 by the file operation execution control 30, whereby the user ID conversion is called. The user ID conversion 39 executes the examination of the mail ID of the mail sender and the conversion from this mail ID into the corresponding host ID by using the mail/host ID conversion file 17. The host ID is utilized in a similar manner to that of the embodiment 1. Then, the access authorization examination 32 is initiated to judge whether or not the file name designated by the proposal bibliography 7 owns the access authorization in its host ID. If the file name owns the access authorization, then the user file operation 31 is initiated, thereby performing the file operation designated by the proposal bibliography. A file operation result is stored as a result announcement mail into the post-office box 15 designated to user in the mail box branch 16. This result announcement mail is finally stored in the post-office box 11 designated to user of the electronic mail server 6 by way of the mail exchange process. With a series of the above-explained process operations, a similar operation to that of the embodiment 1 may be performed at the mail terminal 1. It should be noted that since other constructive elements of FIG. 11 are identical to those of FIGS. 1A and 1B except for the construction of the host computer 5, explanations thereof are omitted.

Although the judgement as to whether or not the host computer is brought into either the malfunction, or the inactive state due to the degradation of system performance, has been performed by the job control terminal 4 in the previous embodiment 1, according to this embodiment, the mail exchange 13 within the electronic mail server 2 periodically communicates with the host computer and a judgement is done as to whether or not the mail exchange 13 can be communicated with the host computer under normal condition. When the mail exchange 13 cannot be communicated with the host computer designated by the proposal bibliography 7, the mail is held in the mail box 6 and the wait condition is maintained until the system starts its operation. When the host computer is not designated by the proposal bibliography 7, a selection is made of the host computer under operation.

The above-described explanations are made of the embodiment 2. Then, a modification of this embodiment 2 will now be explained. That is, this modification is so arranged that the disk files 24 and 25 to be connected to the host computers are separately provided with the respective host computers. In such an arrangement, the respective host computers are geographically dispersed, which is present as a sole system. FIG. 12 represents an LIST command 171 for indicating a content of a file by the TSS terminal 26 (FIGS. 1A and 1B or FIG. 11), an LISTC command 175 for showing a list of file names, and an LISTD command 176 for displaying a member name present in the file. In these commands, there are newly provided a file name 172 and a MAIL operand 173 for designating a content of a file and a distribution designation of a file name list. The MAIL operand 173 designates a distribution designation ID (174). This MAIL operand 173 is processed by the file operation execution control 30 in a similar manner to that of the proposal bibliography of the file operation request. Under control of the TSS control 22 shown in FIG. 11, the LIST command and the LISTC command are executed as a task of the TSS command 28 to initiate the file operation execution control 30, so that the file operations designated by these commands 171, 175 and 176 are executed. Upon completion of the file operation, the file operation result is finally stored as the mail into the mail box 6 of the electronic mail server 2 based upon the distribution destination instructed by the TSS command.

In accordance with the present invention, the file operations, for instance, the reading/writing operations of the file employed in the computer system can be performed by the mail terminal. Modifications of the job control language used to designate the job execution method and of the data files utilized during the job execution may be performed.

Since the electronic mail system and the computer system are independently arranged and the information exchanging means is provided between these systems, the mail terminal need not be previously defined on the computer system, but is connected thereto by a telephone line, whereby the file operation may be proposed everywhere the mail terminal is used.

Since the job control terminal has such a structure that this control terminal is independently operable with the computer system, a proposal of file operation is always acceptable independent to the operation time of the system computer. Also, since the operation of the computer system is wholly managed by the external units, the computers under operation except for the computer under malfunction, or degradation may be selected.

The access authorization judgement of the file which should be operated and has been designated by the mail, so that secrecy of the computer system can be protected.

Furthermore, according to the present invention, the contents of the file may be received as the electronic mail from the TSS terminal.

What is claimed is:

1. An electronic mail drive type computer system, comprising:

a first computer system having a file storage apparatus for storing data files; and a monitoring apparatus connected to said first computer system for monitoring an operation state of said first computer system, said monitoring apparatus including:

first means connected through a communication network to an electronic mail system constructed on a second computer system for receiving a mail which has been issued from a mail terminal and transmitted from said electronic mail system to said monitoring apparatus through said communication network independently of the operation state of said first computer system, said mail including information for requesting execution of a file-operation related to said data files held in said file storage apparatus;

second means for producing a sequence of commands to request said first computer system to execute the requested file-operation; and third means for controlling transfer of said sequence of commands to said first computer system, depending upon the monitored operation state of said first computer system.

2. An electronic mail drive type computer system as claimed in claim 1, wherein said first computer system includes a plurality of computers and a plurality of file storage apparatuses shared by said computers, said monitoring apparatus includes means for monitoring operation states of the respective computers, and said third means includes fourth means for selecting one of said plural computers to which said sequence of commands is to be transferred, depending upon the monitored operation states.

3. An electronic mail drive type computer system as claimed in claim 2, wherein said file-operation requesting mail includes information to designate one of said plural computers which should execute the file-operation, and said fourth means includes means for selecting said one of said plural computers as designated by the information.

4. An electronic mail drive type computer system as claimed in claim 2, wherein said fourth means includes means for selecting one of said plural computers in accordance with a predetermined order of said computers.

5. An electronic mail drive type computer system as claimed in claim 1, wherein said monitoring apparatus further includes:

means for storing authorized electronic mail system identifiers assigned to a plurality of users who have been authorized as users capable of requesting execution of a file-operation on said files by way of said electronic mail system; and means for judging whether or not an electronic mail system identifier contained in the received file-operation requesting mail corresponds to one of said authorized electronic mail system identifiers, and for sustaining producing of said sequence of commands when said electronic mail system identifier contained in the mail does not correspond to any of said authorized electronic mail system identifiers.

6. An electronic mail drive type computer system as claimed in claim 1, wherein said monitoring apparatus further includes:

memory means for storing a plurality of electronic mail system identifiers assigned to a plurality of users who have been authorized as users capable of requesting execution of a file-operation on one of said files by way of said electronic mail system, and a plurality of computer system identifiers for said first computer system, assigned to the respective authorized users in such a manner that each of said authorized electronic mail system identifiers is stored in correspondence to one of said computer system identifiers; and means for converting an electronic mail system identifier contained in the received file-operation requesting mail into a corresponding computer system identifier by using said authorized electronic mail system identifiers and said computer system identifiers stored in said memory means, and for sending said computer system identifier obtained by said conversion to said first computer system together with said sequence of commands.

7. An electronic mail drive type computer system as claimed in claim 1, wherein said monitoring apparatus further comprises:

means for receiving contents of one of said data files read out from said file apparatus by said first computer system when said file-operation requested by said mail is read-operation of said one data file; and means for transmitting a response mail including said received contents to said electronic mail system.

8. An electronic mail drive type computer system as claimed in claim 1, wherein said monitoring apparatus further comprises:

means for transmitting write data included in said received mail to said first computer system as part of said sequence of commands produced, when said file-operation requested by said mail is write-operation of said write data into one of said data files.

9. An electronic mail drive type computer system as claimed in claim 1, wherein said monitoring apparatus further comprises:

means for supplying said first computer system with a command which includes a computer system identifier assigned to a user of said mail for use of said first computer system, when said file-operation requested by said mail is read-operation of a list of data file names, so as to request said first computer system to read a file name list of file names assigned with the computer system identifier; and means for transmitting a response mail which includes the file name list to said electronic mail system, when the file name list is supplied by said first computer system.

10. An electronic mail drive type computer system as claimed in claim 6, wherein said monitoring apparatus further comprises:

means for examining whether a mail sender of said file-operation requesting mail owns authorization for access to a data file designated by said mail based upon said computer system identifier converted from said electronic mail system identifier.

11. An electronic mail drive type computer system as claimed in claim 1, wherein said monitoring apparatus further comprises:

means for producing a command which requests conversion of a first character stream stored in one of said data files designed by said requesting mail into a second character stream instructed by said requesting mail, when said file-operation requesting mail requests the conversion.

12. A file operation method of a computer system, comprising the steps of:

supplying, from a TSS (Time Shared System) terminal to said computer system, with a command to read contents of a data file stored in the computer system;

reading out the contents of said data file by said computer system in response to said command;

transmitting an electronic mail which includes said read contents from said computer system to an electronic mail system connected to said computer system through a communication network; and transmitting said electronic mail to at least one mail terminal from said electronic mail system in response to a user operation of the mail terminal.

13. A file operating method of a computer as claimed in claim 12, wherein a distribution address is designated by said command, and said content of said data file is distributed to said mail terminal by using said designated distribution address.

14. A file operating method of a computer as claimed in claim 12, wherein said electronic mail system is managed by another computer system.

15. A file operating method of a computer as claimed in claim 12, further comprising the steps of:

transferring the read contents of said data file from said computer system to an operation monitoring apparatus coupled to said computer system; and producing said electronic main containing the contents of said data file by said operation monitoring apparatus, and wherein said distributing of said mail is carried out by said operation monitoring apparatus.

16. A file operating method of a computer as claimed in claim 12, further comprising the step of:

producing said electronic mail containing the contents of said file by said computer system, and wherein said distributing of said mail is carried out by said computer system.

17. A file operating method, comprising the steps of:

transmitting an electronic mail for designating a file-operation request with regard to a data file stored in a file storage apparatus within a first computer system from a mail terminal to an electronic mail system constituted on a second computer system;

transmitting said electronic mail from said electronic mail system to said first computer system through a communication network;

converting said file-operation request into a sequence of commands and executing the sequence of commands at said first computer system; and transmitting a response mail which includes execution results of said sequence of commands from said first computer system to said electronic mail system through said communication network.

18. A file operating method of a computer as claimed in claim 17, further comprising the step of:

selecting, from a plurality of computers constituting said computer system, a computer for executing a file-operation requested by said file-operation request.

19. A file operating method of a computer as claimed in claim 17, further comprising the steps of:

storing in said computer system, electronic mail system identifiers assigned to a plurality of users of the electronic mail system;

judging by said computer system, whether or not an electronic mail system identifier of a mail sender who has sent the file-operation request corresponds to one of said electronic mail system identifiers; and executing by said first computer system, the file-operation requested by said request if said electronic mail system identifier corresponds to one of said electronic mail system identifiers, and sustaining execution of said file-operation, otherwise.

20. A file operating method of a computer as claimed in claim 17, further comprising the steps of:

preparing in said first computer system a conversion table which includes a plurality of electronic mail system identifiers assigned to a plurality of users of said electronic mail system and a plurality of computer system identifiers assigned to the respective users in such a manner that each of said electronic mail system identifiers corresponds to one of said computer system identifiers;

converting into a corresponding computer system identifier, an electronic mail system identifier of a mail sender contained in the mail by said first computer system on the basis of said conversion table;

judging by said first computer system, whether a user with said computer system identifier converted from said electronic mail system identifier owns authorization for access to a file designated by said mail; and executing the file-operation by said first computer system when the user with said computer system identifier has been judged as one owning the authorization.

21. A computer network comprising:

a computer system having a storage apparatus for storing data files;

a mail controller connected to said computer system; and an electronic mail server connected to a plurality of mail terminals and said mail controller through a communication network, for distributing file-operation requesting mails received from said mail terminals to a first storage area corresponding to said mail controller and for selectively distributing response mails received from said mail controller to one of a plurality of second storage areas prepared correspondingly to said mail terminals, wherein said mail controller includes:

means for receiving a file-operation requesting mail from said first storage area of said electronic mail server;

means for producing a sequence of commands produced depending upon contents of the received file-operation requesting mail;

means for supplying the sequence of command to said computer system and for receiving response data from said computer system, said response data being obtained as a result of file-operation executed by said computer system in accordance with said sequence of commands; and means for transmitting said response data to said electronic mail server in a form of a response mail.

* * * * *